US012706497B2

(12) United States Patent
Terauchi et al.

(10) Patent No.: US 12,706,497 B2
(45) Date of Patent: Aug. 11, 2026

(54) ELECTRICAL ROTATING DEVICE WITH SEGMENTED PARTITION WALL

(71) Applicant: IHI Corporation, Tokyo (JP)

(72) Inventors: Tetsuyuki Terauchi, Tokyo (JP); Takehiro Jikumaru, Tokyo (JP)

(73) Assignee: IHI Corporation, Tokyo (JP)

( * ) Notice: Subject to any disclaimer, the term of this patent is extended or adjusted under 35 U.S.C. 154(b) by 212 days.

(21) Appl. No.: 18/623,122

(22) Filed: Apr. 1, 2024

(65) Prior Publication Data

US 2024/0243630 A1 Jul. 18, 2024

Related U.S. Application Data

(63) Continuation of application No. PCT/JP2022/042962, filed on Nov. 21, 2022.

(30) Foreign Application Priority Data

Feb. 14, 2022 (JP) ................................ 2022-020442

(51) Int. Cl.
*H02K 1/32* (2006.01)
*H02K 5/10* (2006.01)

(52) U.S. Cl.
CPC ................. *H02K 1/32* (2013.01); *H02K 5/10* (2013.01)

(58) Field of Classification Search
CPC ............ H02K 1/32; H02K 5/10; H02K 5/203; H02K 9/19; H02K 9/00; H02K 5/00; H02K 1/00; Y02T 10/64
See application file for complete search history.

(56) References Cited

U.S. PATENT DOCUMENTS 6,933,633 B2 * 8/2005 Kaneko .................... H02K 1/20 310/52
12,374,968 B2 * 7/2025 Jöckel .................... H02K 7/083
2013/0038151 A1 2/2013 Ohashi et al.
(Continued)

FOREIGN PATENT DOCUMENTS

CN 105471131 A 4/2016
DE 102009052932 A1 * 6/2011 ............ H02K 5/128
(Continued)

OTHER PUBLICATIONS

Machine Translation of DE 102009052932 A1 (Year: 2011).*
(Continued)

*Primary Examiner* — Oluseye Iwarere
*Assistant Examiner* — Charlie Frank Mann, Jr.
(74) *Attorney, Agent, or Firm* — Oblon, McClelland, Maier & Neustadt, L.L.P.

(57) ABSTRACT

An electrical rotating device includes a hollow cylindrical stator provided with a stator core and a stator coil, a rotor provided rotatably inside the stator, a case that houses the stator and the rotor, and a hollow cylindrical partition wall that is made of electrically conductive metal and partitions an interior space of the case into an inner space with respect to the stator and an accommodation space in which a coil end of the stator coil laterally protruding in an axial direction of a rotary shaft of the rotor from an end of the stator core is accommodated and liquid coolant is circulated. At least a portion of the partition wall close to the stator core is divided into plural small sections by forming plural slits.

7 Claims, 6 Drawing Sheets

(56) References Cited

U.S. PATENT DOCUMENTS

| | | | |
|---|---|---|---|
| 2013/0270931 | A1 | 10/2013 | Handa et al. |
| 2013/0278091 | A1 | 10/2013 | Ohashi et al. |

FOREIGN PATENT DOCUMENTS

| | | | | | |
|---|---|---|---|---|---|
| DE | 10 2013 101 623 | A1 | | 8/2013 | |
| JP | 2003-42155 | A | | 2/2003 | |
| JP | 2003-52155 | A | | 2/2003 | |
| JP | 2003052155 | A | * | 2/2003 | |
| JP | 2003-250240 | A | | 9/2003 | |
| JP | 2006-33916 | A | | 2/2006 | |
| JP | 3896882 | B2 | * | 3/2007 | |
| JP | WO2011/132784 | A1 | | 10/2011 | |
| JP | 2013-55718 | A | | 3/2013 | |
| WO | WO-2012086227 | A1 | * | 6/2012 | ............. H02K 9/197 |

OTHER PUBLICATIONS

Machine Translation of JP 3896882 B2 (Year: 2007).*
Machine Translation of JP 2003052155 A (Year: 2003).*
WO 2012086227 A1 Machine Translation of WO 2012086227 A1 (Year: 2012).*
International Search Report issued Feb. 14, 2023 in PCT/JP2022/042962 filed on Nov. 21, 2022, 2 pages.
Canadian Office Action issued Jun. 23, 2025 in Canadian Patent Application No. 3,235,599, 5 pages.

* cited by examiner

ELECTRICAL ROTATING DEVICE WITH SEGMENTED PARTITION WALL

CROSS-REFERENCE TO RELATED APPLICATIONS

This application is a continuation application of International Application No. PCT/JP2022/042962, filed on Nov. 21, 2022, which claims priority to Japanese Patent Application No. 2022-20442, filed on Feb. 14, 2022, the entire contents of which are incorporated by reference herein.

TECHNICAL FIELD

The present disclosure relates to an electrical rotating device.

BACKGROUND

In an electrical rotating device disclosed in Japanese Patent Application Publication No. 2003-52155 (Patent Literature 1), liquid coolant is filled around its stator and rotor, and the electrical rotating device is cooled by the liquid coolant. The rotations of the rotor agitate the liquid coolant, and, to prevent coil ends of the stator from being damaged by the agitated liquid coolant, a partition wall is provided on each inner side of the coil ends of the stator. By means of the partition walls, the coil ends of the stator are cooled by being immersed in the liquid coolant that is not agitated. The partition wall of the Patent Literature 1 is formed of a non-magnetic and electrically insulative material.

SUMMARY OF THE INVENTION

In the electrical rotating device in the Patent Literature 1, the rotor is also immersed in the liquid coolant. However, immersing the rotor in the liquid coolant causes rotational resistance, and thereby the efficiency of the electrical rotating device is reduced. Therefore, it is desired to cool only the stator, especially the coil ends of the stator, with the liquid coolant. In such cases, it is also desired to make the partition walls separating the rotor from the liquid coolant by metal in order to use the electrical rotating device in a more severe environment. The partition walls disclosed in the above-mentioned Patent Literature 1 are formed of a non-magnetic and electrically insulative material, but, if the partition walls are formed of an inorganic material such as ceramic, for example, brittle fracture may occur due to its insufficient strength. On the other hand, if the partition walls are formed of an organic material such as plastic, its heat resistance may be insufficient. Therefore, it is desired to isolate accommodation spaces of the coil ends by metal partition walls, respectively, and then cool the coil ends with the liquid coolant.

However, if the partition walls are formed of an electrically conductive material, eddy currents are induced inside the electrically conductive partition walls under the influence of magnetic flux between the stator and the rotor, and thereby eddy current losses may occur. As the result, heat generation in the partition walls and a decrease in the efficiency of the electrical rotating device may occur. Therefore, an object of the present disclosure is to provide an electrical rotating device having a structure that can suppress eddy current losses in a partition wall suitable for cooling a coil end of its stator with liquid coolant.

An electrical rotating device according to the present disclosure includes a hollow cylindrical stator provided with a stator core and a stator coil, a rotor provided rotatably inside the stator, a case that houses the stator and the rotor, and a hollow cylindrical partition wall that is made of electrically conductive metal and partitions an interior space of the case into an inner space with respect to the stator and an accommodation space in which a coil end of the stator coil is accommodated and liquid coolant is circulated, wherein at least a portion of the partition wall close to the stator core is divided into plural small sections by forming plural slits or plural contact surfaces.

The plural slits extending in an axial direction of a rotary shaft of the rotor is formed from an end edge of the partition wall closer to the stator core to segment the plural small sections in a circumferential direction of the partition wall.

Or, the portion of the partition wall close to the stator core may be configured of plural annular members that are aligned in an axial direction of a rotary shaft of the rotor and made in contact with each other to segment the plural small sections in the axial direction.

Or, the plural slits extending in a circumferential direction of the partition wall may be formed at least at the portion of the partition wall close to the stator core to segment the plural small sections in an axial direction of a rotary shaft of the rotor.

Here, the electrical rotating device may further include a seal member that has an annular shape and covers all the small sections from at least one of outer and inner circumferential surfaces of the partition wall, wherein the seal member may have a circumferential edge that is sandwiched between an end edge of the partition wall close to the stator core and an end face of the stator core.

According to the electrical rotating device in the present disclosure, it is possible to suppress eddy current losses in a partition wall suitable for cooling a coil end of its stator with liquid coolant.

DETAILED DESCRIPTION OF THE INVENTION

Hereinafter, embodiments of an electrical rotating device 1 will be described with reference to the drawings.

Figure 1:
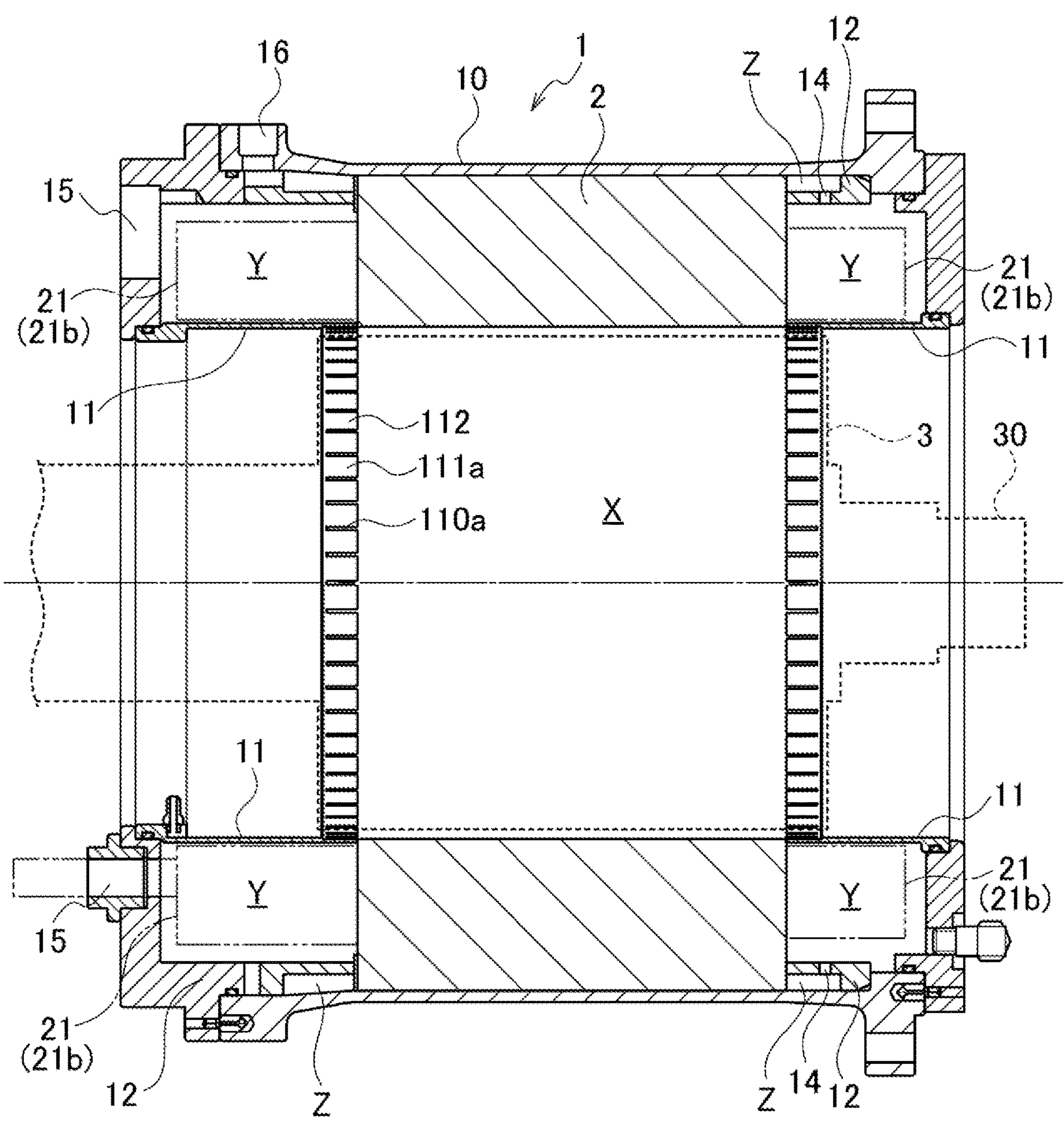
FIG. 1 is a cross-sectional view taken on a cross-section including a rotation axis of an electrical rotating device according to a first embodiment.
Figure 2:
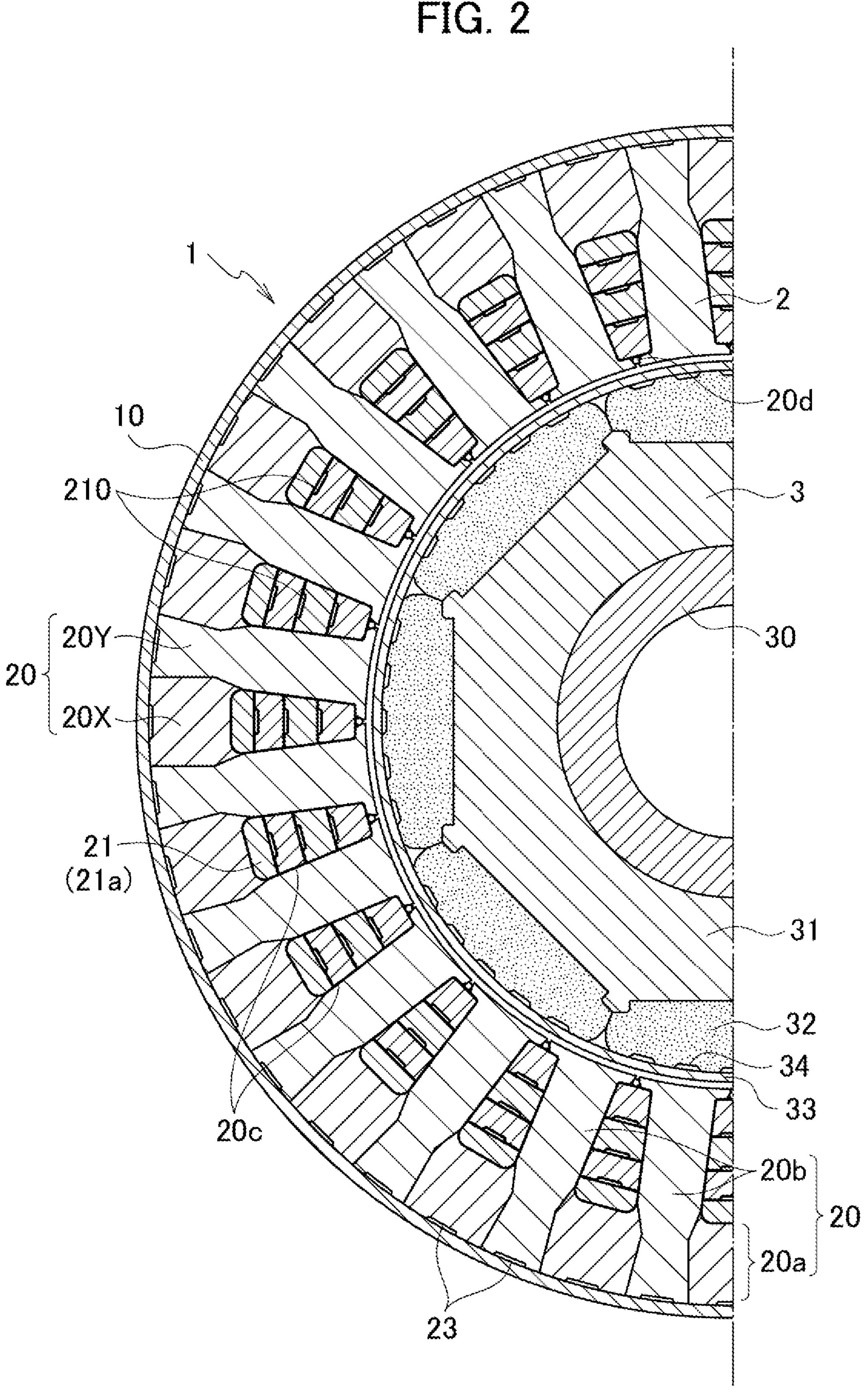
FIG. 2 is a cross-sectional view taken on a cross-section perpendicular to the rotation axis of the electrical rotating device.

The electrical rotating device 1 according to a first embodiment will be described with reference to FIG. 1 to FIG. 3. As shown in FIG. 1, the electrical rotating device 1 functions as an SPM (Surface Permanent Magnet) type electricity generator. The electrical rotating device 1 includes a stator 2 and a rotor 3. In FIG. 1, the rotor 3 is indicated by dotted lines. The electrical rotating device 1 is provided with a hollow cylindrical case 10. The case 10 houses the stator 2 and rotor 3. More specifically, the stator 2 is fixedly held in the case 10 with being contacted with an inner circumference of the case 10. Both ends of a rotary shaft 30 of the rotor 3 are supported by the case 10 via bearings, respectively.

The rotor 3 is rotatably provided inside the hollow cylindrical stator 2. The rotor 3 is provided with the rotary shaft 30, a rotor core 31, permanent magnets 32, and a sleeve 33. As shown in FIG. 2, the rotor core 31 is fixed with the rotary shaft 30. The plural permanent magnets 32 are fixed on an outer circumference of the rotor core 31. The permanent magnets 32 are arranged in eight rows in a circumferential direction, and in each row, plural (e.g., four) of them are also aligned in an axial direction.

The sleeve 33 is fixed on an outer side of the permanent magnets 32 to prevent the permanent magnets 32 from dropping out from the rotor core 31 due to a centrifugal force caused by the rotations of the rotor 3. The sleeve 33 is formed of ferrous metal. On each outer surface of the permanent magnets 32, plural coolant flow grooves 34 are formed in the axial direction. The coolant flow grooves 34 form liquid coolant flow passages between the permanent magnets 32 and the sleeve 33.

On the other hand, the stator 2 is provided with a stator core 20 and a stator coil 21. The stator core 20 is configured of electromagnetic steel sheets laminated in the axial direction and has a hollow cylindrical yoke 20*a* and plural (e.g., twenty-four) teeth 20*b* protruding inwardly from this yoke 20*a* in a radial direction of its hollow cylindrical shape. A slot 20*c* is formed between adjacent teeth 20*b*. The stator coil 21 is routed in the slot 20*c*. The stator coil 21 is configured of quadrangular wires 21*a*. A "quadrangular wire" has a quadrilateral cross section and is sometimes referred to as a flat wire or a rectangular wire. The quadrangular wire 21*a* in the present embodiment has a trapezoidal cross section that narrows in its width inwardly in the radial direction in the slot 20*c*.

The quadrangular wire 21*a* need not have the trapezoidal cross section at coil ends 21*b* of the stator coil 21 (see FIG. 1), for example, it may have a rectangular cross section. The coil ends 21*b* are projected laterally outward from the ends of the stator core 20 in the direction of the rotation axis of the rotor 3, respectively.

Each open end of the teeth 20*b* is extended in the circumferential direction to form flanges. Each of the slots 20*c* has a trapezoidal cross section that is long in the radial direction. Each inner width of the slots 20*c* narrows toward the flanges, i.e., inwardly in the radial direction. Within each of the slots 20*c*, the four quadrangular wires 21*a* with trapezoidal cross-sections are aligned in the radial direction. With respect to a circumferential width of the quadrangular wires 21*a* within the slots 20*c*, they gradually narrow inwardly in the radial direction in accordance with each width of the slots 20*c*. Radial heights of the quadrangular wires 21*a* in the slot 20*c* are gradually made larger as they go inward in the radial direction. Cross-sectional area of the quadrangular wires 21*a* in the slot 20*c* are approximately the same because of the widths and heights described above, and electrical resistance per length of the quadrangular wires 21*a* is approximately identical.

A coolant flow groove 210 is formed on some of the quadrangular wires 21*a*, and thereby a flow passage for liquid coolant is formed between adjacent quadrangular wires 21*a*. The radially most inward quadrangular wire 21*a* is received by the above-mentioned flanges at the open ends of the teeth 20*b*. Note that a gap is formed between opposed ends of the flanges, but this gap is closed by a ceramic spacer 20*d* (see FIG. 2) that has a circular cross-section and extends in the axial direction. The spacer 20*d* prevents later-described liquid coolant circulated inside the stator 2 from leaking into an inner space X where the rotor 3 is accommodated. In the present embodiment, the spacer 20*d* is fixed to the teeth by adhesive.

The stator core 20 is constructed from plural circumferential members 20X that form portions of the yoke 20*a* and radial members 20Y that form the remains of the yoke 20*a* and the teeth 20*b*. Since the stator core 20 is configured of the axially stacked electromagnetic steel sheets as described above, the circumferential members 20X and the radial members 20Y are also configured of the axially stacked electromagnetic steel sheets. The circumferential members 20X and the radial members 20Y are arranged alternately in the circumferential direction to construct the stator core 20. The yoke 20*a* is formed by the circumferential members 20X and the outer circumferential portions of the radial members 20Y that are alternately arranged. The circumferential members 20X are located radially outside of the slots 20*c* and function as caps that retain the quadrangular wires 21*a* stored in the slots 20*c* from the outer side.

The circumferential members 20X and the radial members 20Y, arranged alternately in the circumferential direction, are secured by the case 10 from the outer side. On the outer circumference of the stator core 20, coolant flow grooves 23 through which the liquid coolant circulates are extended in the axial direction. The coolant flow grooves 23 form liquid coolant flow passages between the stator core 20 and the case 10.

As shown in FIG. 1, the electrical rotating device 1 also includes a pair of partition walls 11 that partition an interior space of the case 10 into the inner space X with respect to the stator 2 and accommodation spaces Y in which the coil ends 21*b* of the stator 2 are accommodated, respectively. Each of the partition walls 11 is hollow cylindrical and made of electrically conductive metal. The accommodation spaces Y of the coil ends 21*b* are isolated by the partition walls 11, and the two annular accommodation spaces Y are communicated with each other by the above-mentioned coolant flow grooves 210 (see FIG. 2). Supplemental partition walls 12 are also provided on a radially outer side of the accommodation spaces Y, respectively. The supplemental partition wall(s) 12 forms a supplemental space Z on the outer side of the accommodation space Y. The two annular supplemental spaces Z are communicated with each other by the above-mentioned coolant flow grooves 23 (see FIG. 2).

At one end of the case 10, a supply port 16 is formed to supply the liquid coolant to the supplemental space Z. Plural through holes 14 are formed on the supplemental partition wall 12 at the other end of the case 10 to allow the liquid coolant to flow from the other supplemental space Z to the accommodation space Y. The through holes 14 are spaced apart from one another in the circumferential direction. In addition, a discharge port 15 is formed at the one end of the case 10 to discharge the liquid coolant from the accommodation space Y located at the one end. In the present embodiment, the liquid coolant is circulated in the accommodation spaces Y to suppress a decrease in efficiency of the electrical rotating device 1 due to high temperatures. Since the liquid coolant is not circulated or filled in the inner space X where the rotor 3 is disposed, the liquid coolant does not generate a rotational resistance of the rotor 3 and not cause the decrease in the efficiency of the electrical rotating device 1. Liquid sealing and circulation of the liquid coolant will be explained later.

The electrical rotating device 1 is operated by magnetic flux acting between the stator 2 and the rotor 3. This magnetic flux also affects outer areas from the ends of the stator 2 and the rotor 3 in the axial direction. Therefore, the above-mentioned magnetic flux induces eddy currents inside the partition walls 11 made of electrically conductive metal, and thereby the eddy currents cause eddy current losses. The eddy current losses, which are Joule heat losses, generate heat in the partition walls 11 and decrease the efficiency of the electrical rotating device 1. In the present embodiment, slits 110*a* are formed in the partition wall(s) 11 as shown in FIG. 3 to suppress the eddy current losses by reducing each size of eddies of the eddy currents inside the partition wall 11.

Since a portion of the partition wall 11 close to the stator 2 and the rotor 3 is most affected by the magnetic flux, the portion of the partition wall 11 close to the stator core 20 is divided into plural small sections 111*a* by forming the slits 110*a*, and thereby voltage (induced electromotive force) induced in the small section(s) 111*a* is made smaller. It is known that (eddy current)=(induced electromotive force)×(resistance), so that magnitude of eddy currents is also affected by electrical resistance (conductivity of the material). Since eddy current loss is proportional to square of induced electromotive force and inversely proportional to resistance, the effect of the induced electromotive force is greater. Therefore, the formation of the small sections 111*a* reduces each size of eddies of the eddy currents and thereby the induced electromotive force is reduced, so that the eddy current loss can be effectively suppressed. Note that FIG. 3 shows a longitudinal cross-sectional view and only its upper half is illustrated. Its lower half is also symmetrically formed.

In the present embodiment, the plural slits 110*a* extending in the axial direction of the rotary shaft 30 are formed from the end edge of the partition wall 11 close to the stator core 20 to segment the plural small sections 111*a* in the circumferential direction of the partition wall 11. Dividing the portion of the partition wall 11, especially its portion susceptible to the magnetic flux, into the plural small sections 111*a* in this manner can reduce each size of eddies of the eddy currents as indicated by an arrow EC in FIG. 3, and thereby the eddy current losses can be suppressed. As a result, the heat generated by the electrical resistance of the partition wall 11 and the decrease in the efficiency of the electrical rotating device 1 can be suppressed.

Note that in the present embodiment, the small sections 111*a* are divided so that their respective circumferential width is 2 to 15 mm. The eddy current losses can be suppressed by restricting each size of eddies of the eddy currents by dividing the small sections 111*a* to have such a size.

In addition, the liquid coolant circulates in the accommodation space(s) Y and the supplemental space(s) Z as described above, but it is needed that they are liquid-sealed to prevent the liquid coolant from leaking into the inner space X. Since the slits 110*a* are formed in the partition wall 11, the liquid coolant will leak from the accommodation space Y to the inner space X through the slits 110*a* without liquid-sealing. In the present embodiment, an annular seal member 112 having a U-shaped cross section is attached to the end edge of the partition wall 11 close to the stator core 20. The seal member 112 is made of rubber having elastic resilience and covers all the small sections 111*a*, i.e., all the slits 110*a*, from both the outer and inner circumferential surfaces of the partition wall 11. However, the seal member 112 need only cover all the small sections 111*a*, i.e., all the slits 110*a*, from at least one of the outer and inner circumferential surfaces of the partition wall 11.

The seal member 112 prevents the liquid coolant from leaking through the slits 110*a*. The seal member 112 in the present embodiment also has a circumferential edge 113 that is sandwiched between the end edge of the partition wall 11 and the end face of the stator core 20. The circumferential edge 113 corresponds to a bent portion of the U-shaped cross section of the seal member 112. The circumferential edge 113 having elastic resilience is sandwiched between the partition wall 11 and the stator core 20, and thereby the liquid coolant can be prevented from leaking out between the partition wall 11 and the stator core 20. More particularly, the circumferential edge 113 is pressed onto end faces of the teeth and the spacers 20*d* of the stator core 20 that are described above.

Figure 3:
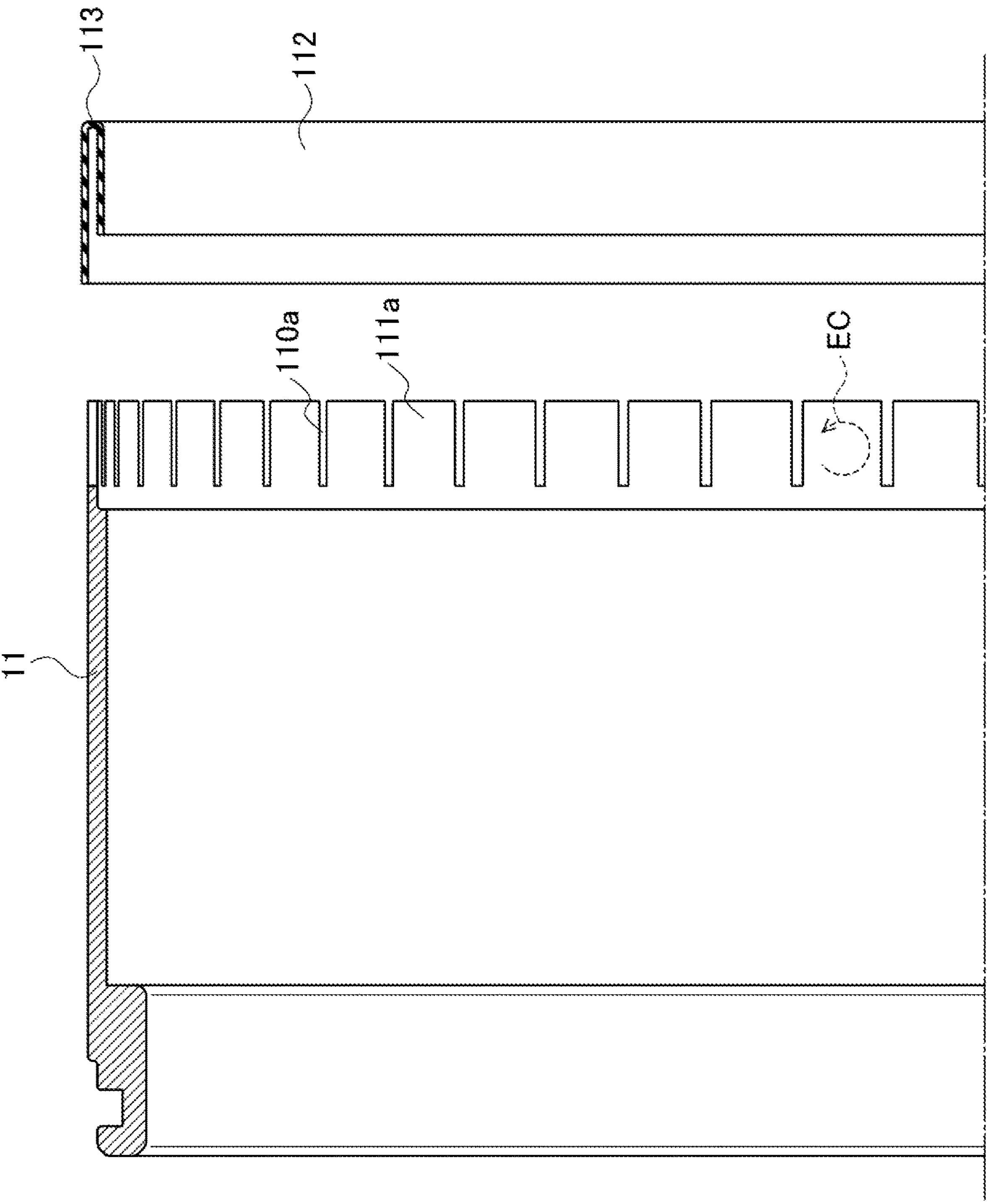
FIG. 3 is a partially exploded view of a partition wall in the electrical rotating device.

Note that the seal member 112 need have the U-shaped cross-section as shown in FIG. 3 at least in its installed state, and may have a flat sheet-shape before being installed on the partition wall 11. In addition, the seal member 112 need have the annular form at least in its installed state, and may have a band shape having two ends before being installed. In such a case, the seal member 112 is attached to the end edge of the partition wall 11 so that the two ends of the band shape are butted against each other so that no gap is created therebetween when being attached to the end edge of the partition wall 11.

The circulation of the liquid coolant is described below. The liquid coolant is supplied from the supply port 16 to the supplemental space Z on the left side in FIG. 1. The liquid coolant then flows through the coolant flow grooves 23 to the supplemental space Z on the right side in FIG. 1 while cooling the stator core 20. The liquid coolant then flows into the right-side accommodation space Y through the through holes 14. The right-side coil end 21*b* is cooled by the liquid coolant in the right-side accommodation space Y. Further, the liquid coolant flows to the accommodation space Y on the left side in FIG. 1 through the coolant flow grooves 210 while cooling the stator coil 21. The stator core 20 is also cooled via the stator coil 21. The left-side coil end 21*b* is also cooled by the liquid coolant in the left-side accommodation space Y.

The liquid coolant in the left-side accommodation space Y is discharged from the discharge port 15 to the outside of the case 10. The liquid coolant flows in this manner but the liquid coolant does not leak out into the inner space X, because the accommodation spaces Y are isolated from the inner space X liquid-tightly by the partition walls 11 each having the seal member 112. Although not explained in detail, the liquid coolant is also circulated through the coolant flow grooves 34 of the rotor 3 via the inside of the rotary shaft 30.

Figure 4:
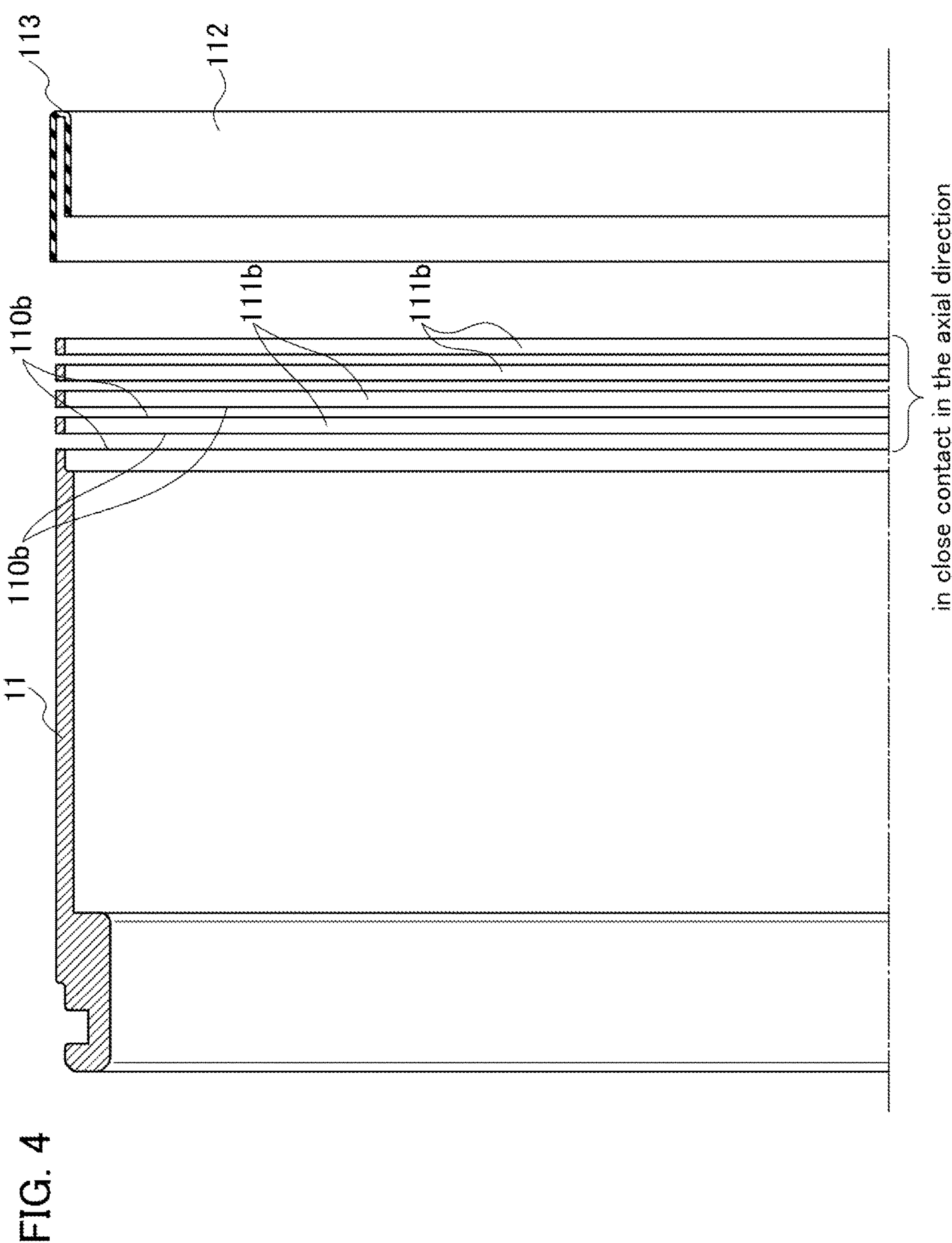
FIG. 4 is a partially exploded view of a partition wall in an electrical rotating device according to a second embodiment.

Next, an electrical rotating device 1 according to a second embodiment will be described with reference to FIG. 4. FIG. 4 is a drawing corresponding to FIG. 3 of the first embodiment. In the electrical rotating device 1 according to the present embodiment, only its partition walls 11 differ from the partition walls 11 of the first embodiment. More specifically, only the divided form of the partition wall(s) 11 into the small sections 111*b* differs from the divided form into the small sections 111*a* in the first embodiment. Therefore, only the partition wall(s) 11 will be described below. The configurations other than the partition wall(s) 11 are the same as those in the first embodiment described above.

In the first embodiment, the portion of the partition wall 11 close to the stator core 20 is divided into the plural small sections 111*a* by forming the slits 110*a*. On the other hand, in the present embodiment, the portion of the partition wall 11 close to the stator core 20 is divided into plural small sections 111*b* by forming contact surfaces 110*b*. More particularly, the portion of the partition wall 11 close to the stator core 20 is formed by plural annular members that are aligned in the axial direction of the rotary shaft of the rotor 3 and are in contact with each other, and thereby the plural small sections 111*b* are segmented in the axial direction. That is, in the present embodiment, the annular members are the small sections 111*b*, so the reference number 111*b* is also used for the annular members.

Each of the annular members 111*b* is coated with an insulating film to ensure electrical insulations between the main body of the partition wall 11 and the annular member 111*b* and between adjacent annular members 111*b*. Therefore, each size of the eddies of the eddy currents can be reduced due to the restriction of the eddy currents within each width of the annular members 111*b*, and thereby the eddy current losses can be suppressed. As a result, the heat generated by the electrical resistance in the partition wall 11 and thereby the decrease in the efficiency of the electrical rotating device 1 can be suppressed. In the present embodiment, the contact surfaces 110*b* between the main body of the partition wall 11 and the annular member 111*b* and between the adjacent annular members 111*b* are bonded by an adhesive. If electrical insulation can be ensured by the adhesive, the insulating film need not be provided. Since the electrical resistance will increase even when the contact surfaces 110*b* are simply brought into contact with each other with no insulating film nor the adhesive layer, each size of the eddies of the eddy currents can be reduced.

Each width of the annular members 111*b* in the present embodiment is about 0.1 to 15 mm. Also in the present embodiment, provided is the seal member 112 that covers all the annular members 111*b* as the small sections from both the outer and inner circumferential surfaces of the partition wall 11, i.e., covers all the contact surfaces 110*b*. The seal member 112 need only cover all the small sections 111*b*, i.e., cover all the contact surfaces 110*b*, from at least one of the outer and inner circumferential surfaces of the partition wall 11. Therefore, the seal member 112 prevents the liquid coolant from leaking through the contact surfaces 110*b*. The liquid coolant can be prevented from leaking out between the partition wall 11 and the stator core 20 by the circumferential edge 113 of the seal member 112.

Figure 5:
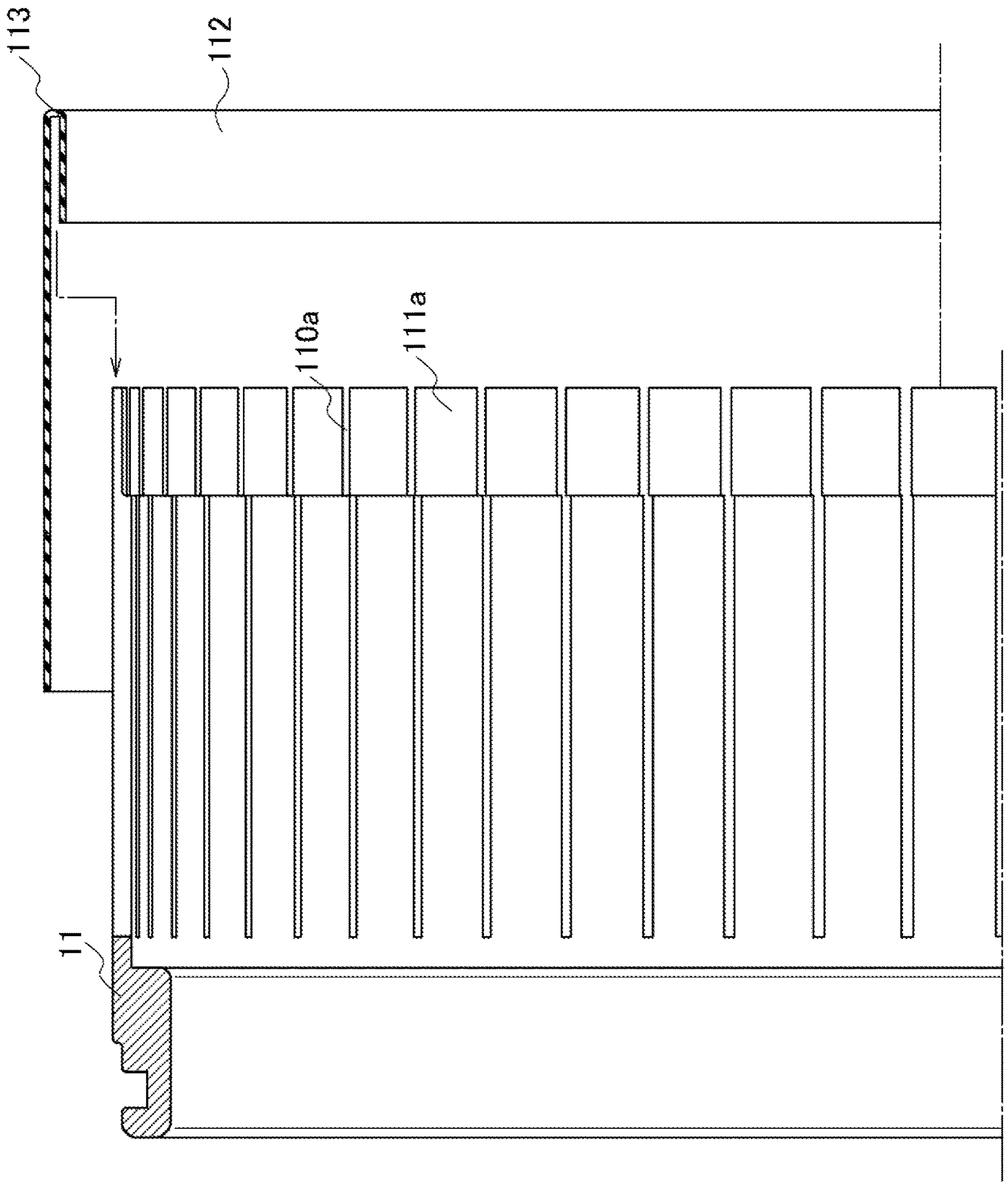
FIG. 5 is a partially exploded view of a partition wall in an electrical rotating device according to a third embodiment.

Next, an electrical rotating device 1 according to a third embodiment will be described with reference to FIG. 5. FIG. 5 is also a drawing corresponding to FIG. 3 of the first embodiment. In the electrical rotating device 1 according to the present embodiment, its partition walls 11 and its seal member 112 differ from the partition walls 11 and the seal member 112 of the first embodiment. Therefore, only the partition wall(s) 11 and the seal member(s) 112 will be described below.

In the electrical rotating device 1 according to the present embodiment, each length of the slits 110*a* differs from that in the partition wall 11 of the first embodiment. As mentioned above, the portion of the partition wall 11 close to the stator 2 and the rotor 3 is most affected by the magnetic flux, but the eddy current loss can be more suppressed compared to the first embodiment by also dividing a portion far from the stator 2 and the rotor 3 into the small sections 111*a*. As a result, the heat generated by the electrical resistance in the partition wall 11 and the decrease in the efficiency of the electrical rotating device 1 can be more suppressed.

Since each of the small sections 111*a* is made larger than that in the first embodiment, the seal member 112 for covering them is also made larger. In the present embodiment, the seal member 112 has a J-shaped cross section and covers all the small sections 111*a*, i.e., all the slits 110*a*, from the outer circumferential surface of the partition wall 11. Therefore, the seal member 112 prevents the liquid coolant from leaking through the slits 110*a*. Note that the seal member 112 covers only part of the small sections 111*a*, i.e., part of the slits 110*a*, from the inner circumferential surface of the partition wall 11. However, since the free ends of the small sections 111*a* are covered by the seal member 112 from both the outer and inner circumferential surfaces, the rigidity of the partition wall 11 can be prevented from decreasing. It is same as the first embodiment that the seal member 112 is provided with the circumferential edge 113, and thereby the liquid coolant can be prevented from leaking out between the partition wall 11 and the stator core 20.

Figure 6:
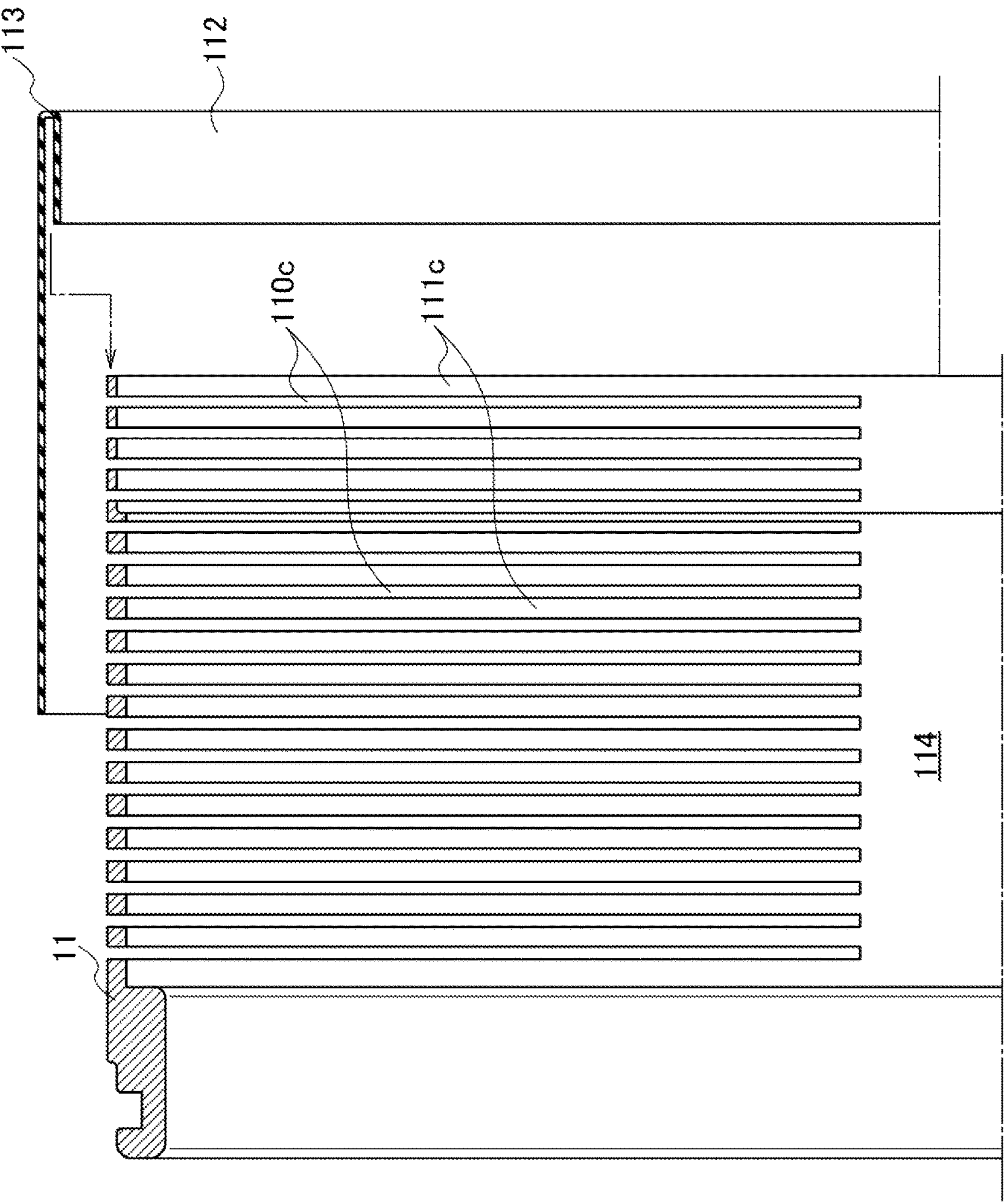
FIG. 6 is a partially exploded view of a partition wall in an electrical rotating device according to a fourth embodiment.

Next, an electrical rotating device 1 according to a fourth embodiment will be described with reference to FIG. 6. FIG. 6 is also a drawing corresponding to FIG. 3 of the first embodiment. Also in the electrical rotating device 1 according to the present embodiment, its partition walls 11 differ from the partition walls 11 of the first embodiment. The seal member 112 is the same as the seal member 112 of the third embodiment. Therefore, only the partition wall(s) 11 will be described below.

In the above-described second embodiment, the portion of the partition wall 11 is divided into the plural small sections 111*b* by forming the contact surfaces 110*b* extending in the circumferential direction. In the present embodiment, plural slits 110*c* extending in the circumferential direction are formed over almost the entire of the partition wall 11 along the axial direction, so that the plural small sections 111*c* are segmented in the axial direction of the rotary shaft 30 of the rotor 3. Each width of the small sections 111*c* in the present embodiment is about 0.1 to 15 mm. Note that the slits 110*c* should be formed at least at the portion of the partition wall 11 closer to the stator core 20, which is susceptible to the magnetic flux as described above.

Each slit 110*c* is formed only on approximately half circumference of the partition wall 11 and the annular members 111*b* independent from each other like as in the second embodiment are not formed. In the present embodiment, the plural small sections 111*c* are monolithically jointed with joint portions 114 in which the slits 110*c* are not formed. The joint portions 114 are provided at two opposite locations in the hollow cylindrical partition wall 11. The seal member 112 has a J-shaped cross-section as in the third embodiment, and covers all the small sections 111*c*, i.e., all the slits 110*c* from the outer circumferential surface of the partition wall 11. The seal member 112 is also provided with the circumferential edge 113.

According to the first to fourth embodiments, the accommodation space Y in which the coil end 21*b* is accommodated and the liquid coolant is circulated is formed by the hollow cylindrical partition wall 11 made of electrically conductive metal. Therefore, the coil end 21*b* can be effectively cooled and the decrease in the efficiency of the electrical rotating device 1 can be suppressed.

In addition, at least the portion of the partition wall 11 close to the stator core 20 is divided into the plural small sections 111*a*-111*c* by forming the slits 110*a* or 110*c* or the contact surfaces 110*b*. Therefore, the size of the eddy of the eddy current in the divided small section(s) 111*a*-111*c* can be reduced, and thereby the eddy current losses can be suppressed. As a result, the heat generated by the electrical resistance of the partition wall 11 and the decrease in the efficiency of the electrical rotating device 1 can be suppressed.

Here, the small sections 111*a*-111*c* are formed at least at the portion of the partition wall 11 close to the stator core 20. Therefore, the eddy current losses can be effectively suppressed in such portion where the eddy currents are easily formed under the influence of magnetic flux.

According to the first and third embodiments, the plural slits 110*a* extending in the axial direction of the rotary shaft 30 are formed from the end edge of the partition wall 11 close to the stator core 20 and thereby the plural small sections 111*a* are divided in the circumferential direction of the partition wall 11. The slits 110*a* like these can be easily formed by machine work. Since the small sections 111*a* can be formed integrally with the main body of the partition wall 11, the position shift of the small sections 111*a* can be minimized and thereby a shape change of the partition wall 11 can be effectively suppressed. By the suppression of the shape change of the partition wall 11, the liquid coolant can be effectively prevented from leaking from the accommodation space Y.

According to the second embodiment, at least the portion of the partition wall 11 close to the stator core 20 is configured of the plural annular members 111*b* that are aligned in the axial direction of the rotary shaft 30 and made in contact with each other, and thereby the plural small sections 111*b* are segmented in the axial direction. Therefore, the annular members 111*b*, i.e., the small sections 111*b*, like these have an annular shape completely continuous over the entire circumference, so that they can effectively withstand the pressure of the liquid coolant in the accommodation space Y.

According to the fourth embodiment, the plural slits 110*c* extending in the circumferential direction of the partition wall 11 are formed at least at the portion of the partition wall 11 close to the stator core 20, so that the plural small sections 111*c* are divided in the axial direction of the rotary shaft 30. The slits 110*c* like these can be also easily formed by machine work. Since the small sections 111*c* can be formed integrally with the main body of the partition wall 11, the position shift of the small sections 111*c* can be minimized and thereby a shape change of the partition wall 11 can be effectively suppressed to prevent the liquid coolant effectively from leaking from the accommodation space Y. Furthermore, the small sections 111*c* have an annular shape completely continuous over the entire circumference, so that they can effectively withstand the pressure of the liquid coolant in the accommodation space Y.

In addition, according to the first to fourth embodiments, the electrical rotating device 1 further includes the annular seal member 112 that covers all the small sections 111*a* to 111*c* from at least one of the outer and inner circumferential surfaces of the partition wall 11. Therefore, the leakage of the liquid coolant through the slits 110*a* or 110*c* or through the contact surfaces 110*b* can be prevented by the seal member 112. Furthermore, the seal member 112 has the circumferential edge 113 that is sandwiched between the edge of the partition wall 11 and the end face of the stator core 20. Therefore, the liquid coolant can be reliably prevented from leaking out between the partition wall 11 and the stator core 20 by the circumferential edge 113 of the seal member 112.

Note that, in the first, third and fourth embodiments, the leakage of the liquid coolant into the inner space X through the slits 110*a* or 110*c* is prevented by the seal member 112 that covers all the small sections 111*a* to 111*c*. However, the leakage may be prevented by filling resin only inside the slits 110*a* or 110*c*. In addition, the electrical rotating device 1 in the above embodiments is an SPM type electricity generator, but it may also be an IPM (Interior Permanent Magnet) type electricity generator. The electrical rotating device may function as an electric motor instead of an electricity generator. Furthermore, the electrical rotating device may be an induction type electrical rotating device including no permanent magnet.

What is claimed is:

1. An electrical rotating device comprising:
- a hollow cylindrical stator provided with a stator core and a stator coil;
- a rotor provided rotatably inside the stator;
- a case that houses the stator and the rotor; and
- a hollow cylindrical partition wall that is made of electrically conductive metal and partitions an interior space of the case into an inner space with respect to the stator and an accommodation space in which a coil end of the stator coil is accommodated and liquid coolant is circulated,
- wherein at least a portion of the partition wall close to the stator core is divided into a plurality of segmented sections by forming a plurality of slits or contact surfaces, each of the plurality of slits being formed by adjacent ones of the segmented sections, or each pair of the plurality of the contact surfaces being an edge face of one of adjacent ones of the segmented sections and an edge face of another of the adjacent ones of the segmented sections.

2. The electrical rotating device according to claim 1, wherein
- the plurality of slits extending in an axial direction of a rotary shaft of the rotor is formed from an end edge of the partition wall closer to the stator core to segment the plurality of segmented sections in a circumferential direction of the partition wall.

3. The electrical rotating device according to claim 1, wherein
- the portion of the partition wall close to the stator core is configured of a plurality of annular members that are aligned in an axial direction of a rotary shaft of the rotor and made in contact with each other to segment the plurality of segmented sections in the axial direction.

4. The electrical rotating device according to claim 1, wherein
- the plurality of slits extending in a circumferential direction of the partition wall is formed at least at the portion of the partition wall close to the stator core to segment the plurality of segmented sections in an axial direction of a rotary shaft of the rotor.

5. The electrical rotating device according to claim 2, further comprising
- a seal member that has an annular shape and covers all the segmented sections from at least one of outer and inner circumferential surfaces of the partition wall,
- wherein the seal member has a circumferential edge that is sandwiched between an end edge of the partition wall close to the stator core and an end face of the stator core.

6. The electrical rotating device according to claim 3, further comprising
- a seal member that has an annular shape and covers all the segmented sections from at least one of outer and inner circumferential surfaces of the partition wall, wherein the seal member has a circumferential edge that is sandwiched between an end edge of the partition wall close to the stator core and an end face of the stator core.

7. The electrical rotating device according to claim 4, further comprising a seal member that has an annular shape and covers all the segmented sections from at least one of outer and inner circumferential surfaces of the partition wall, wherein the seal member has a circumferential edge that is sandwiched between an end edge of the partition wall close to the stator core and an end face of the stator core.

* * * * *